July 14, 1959     J. R. ANDERSON ET AL     2,894,957
REFINING OF CYCLIC ORGANIC CARBONATES
Filed Oct. 18, 1954
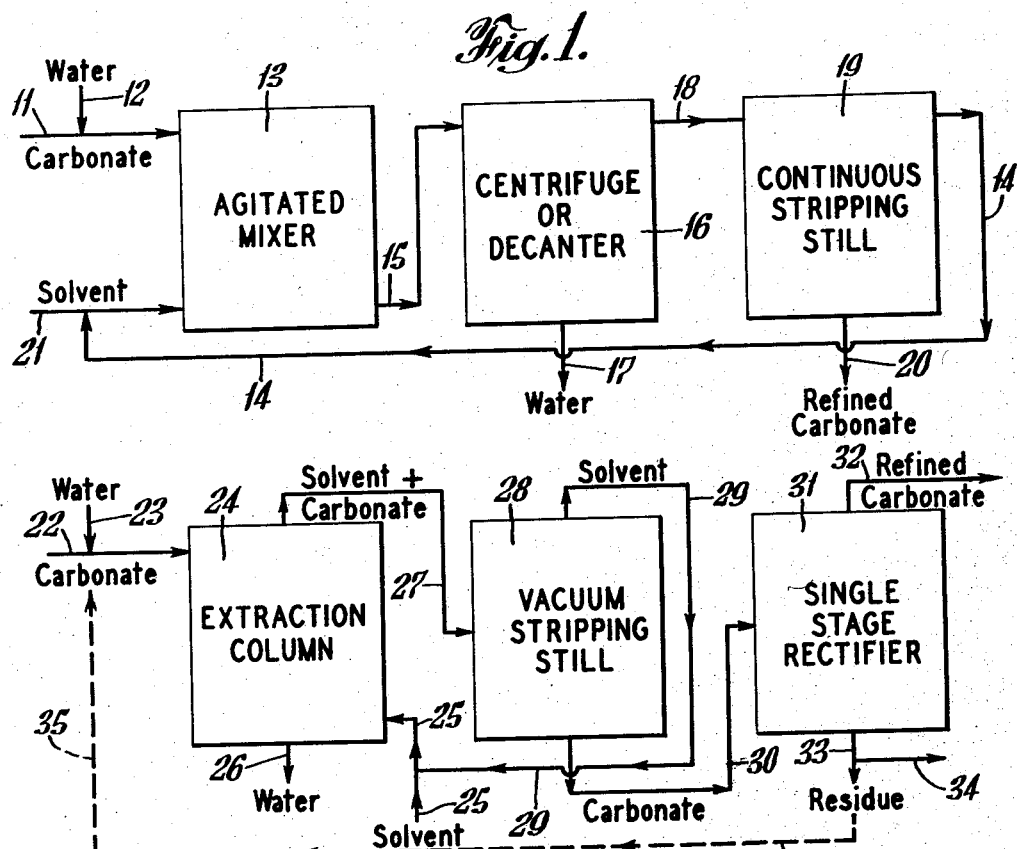
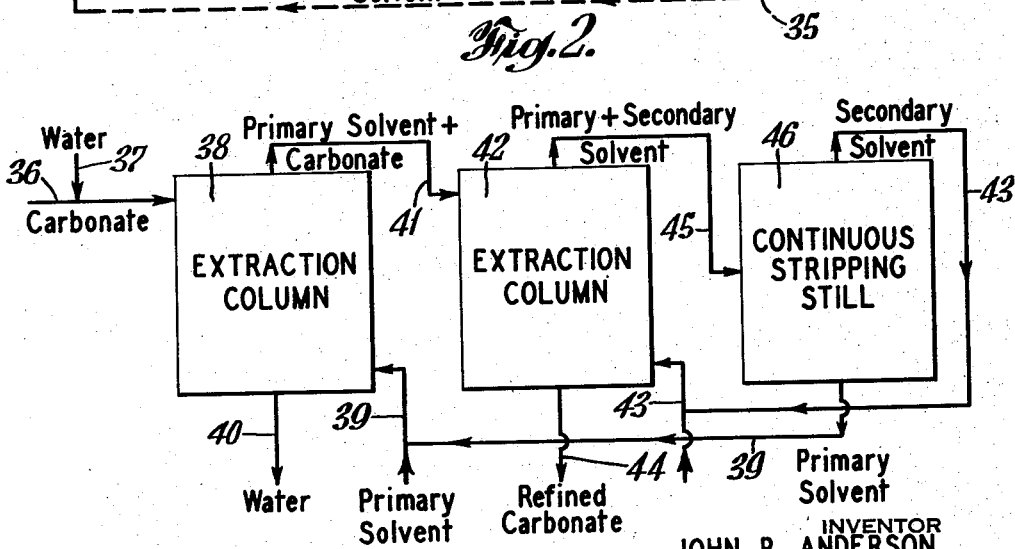
INVENTOR
JOHN R. ANDERSON
WERNER C. VON DOHLEN
BY Louis C. Smith
ATTORNEY

2,894,957

REFINING OF CYCLIC ORGANIC CARBONATES

John R. Anderson, Pittsburgh, Pa., and Werner C. Von Dohlen, South Charleston, W. Va., assignors to Union Carbide Corporation, a corporation of New York Application October 18, 1954, Serial No. 462,814

8 Claims. (Cl. 260—340.2)

This invention relates to the purification of cyclic organic carbonates and more particularly to the removal from said carbonates of water soluble impurities by a process employing extraction.

While suitable wherever it is desired to separate water or water soluble impurities or both from cyclic organic carbonates, the invention is particularly useful for the refining of crude carbonate reaction mixtures which contain water soluble catalysts such as amines. Catalysts of this type are employed where ethylene carbonate is produced by the catalytic reaction of ethylene oxide with carbon dioxide. In the past such crude reaction mixtures have been distilled, usually after neutralization of the catalyst, but this procedure is unsatisfactory because of the considerable decomposition and hydrolysis of the carbonate during the distillation. Two distillations are usually required in this procedure, the first to effect a separation of the carbonate from the catalyst impurities and the second to separate the carbonate product from the contaminating substances such as ethylene glycol formed during the first distillation.

It has been found that aromatic hydrocarbons of the type described below are preferential solvents for cyclic organic carbonates when the carbonates are in water solution. Thus if an excess of one of these solvents is added to a water solution of a carbonate two phases will form in the mixture. The solvent-carbonate phase formed will contain substantially all of the carbonate. Only traces of carbonate will remain in the water phase but any water soluble impurities formerly associated with the carbonate will now be present in the water phase. Relatively pure carbonate can then be separated from the aromatic hydrocarbon solvent by one of several methods outlined below which avoid the formerly necessary distillation of the easily decomposed carbonate. By the process of the invention therefore it is possible to remove water alone from a cyclic organic carbonate or to employ water to remove water soluble impurities from the carbonate in a water-impurities phase.

Thus by the process of the present invention it is possible to separate water or water soluble impurities from cyclic organic carbonates without the repeated high temperature distillations of the prior methods and thus without the attendent formation of undesirable by-products. In a preferred form of the invention, the operation of the process comprises intimately mixing an aromatic hydrocarbon solvent and a water solution or mixture of the carbonate in a vessel which may contain mechanical aids such as mixers, packing, baffles and the like. If the object is to remove water soluble impurities from substantially water free carbonate, then additional water to dissolve the impurities is added to the carbonate before or concurrently with the aromatic hydrocarbon solvent.

The temperature at which the extraction is carried out will depend on the properties of the carbonate being refined. The temperature should be at or above the freezing temperature of the carbonate being treated or of the aromatic hydrocarbon solvent employed, whichever is higher. For example, the preferred operating temperature range for ethylene carbonate, which freezes at 36.4° C., is from 35° to 40° C., depending on the solvent used. The preferred pressure is atmospheric but other pressures may be employed if desired.

After the mixing of the aromatic hydrocarbon solvent with the water and ethylene carbonate, the water phase and the carbonate solvent phase which form are separated by gravity with decanting or by other means such as centrifugal force. More than one extraction stage may be employed if desired. After the two phases have been separated, the carbonate must be separated out of the carbonate-solvent phase. This may be accomplished in several ways. A preferred method, which may be employed where the aromatic hydrocarbon solvent used has a low boiling point, is to distill the solvent off at a lower temperature than the decomposition temperature of ethylene carbonate. Another method is to back-extract the aromatic hydrocarbon solvent from the carbonate-solvent phase by the use of a secondary solvent for the aromatic hydrocarbon solvent, which secondary solvent is immiscible with the carbonate being refined.

Alternatively to the separate addition of solvent and water outlined above, the aromatic hydrocarbon solvent, water and crude ethylene carbonate may be fed at various levels into a multistage extraction column, and then the solvent-carbonate phase may be processed in the manner outlined above. As another alternative the carbonate may be dissolved in the aromatic hydrocarbon solvent and this solution extracted with water, after which the solvent-carbonate solution is separated as before.

It is to be understood that in the procedures outlined above and below water is added to the system for the purpose of dissolving and removing the impurities present. If water is already present as well as impurities or if the process is operated for the primary purpose of removing water itself from carbonate, little or no additional water need be added.

Fig. 1 is a schematic flow-sheet illustrating one embodiment of the invention. Crude carbonate in line 11, together with water in line 12 if needed, is introduced into a mixing vessel 13, which may be of the agitated mixer type. An aromatic hydrocarbon solvent is also introduced into the mixer 13 through the line 21. After mixing, the contents of the mixer 13 are led through line 15 into a separating vessel 16, which may be a decanter, centrifuge or similar apparatus. After separation the water phase, including the impurities, is exhausted from the system through line 17. The solvent-carbonate phase is led through line 18 into a continuous stripping still 19. In the still 19 refined carbonate is recovered as a bottom product and removed through line 20. Solvent from the head of the still 19 is recycled through the line 14 to the solvent feed line 21, for reuse in the process.

Fig. 2 illustrates another embodiment of the invention. Crude carbonate in line 22, together with water, if needed, in line 23 is led into an extraction column 24. An aromatic hydrocarbon solvent is also fed into the extraction column 24 through line 25. After extraction the water phase, containing the impurities, is exhausted from the system through line 26. The carbonate-solvent phase from the extractor column 24 is led through line 27 to a vacuum stripping still 28 from which the solvent is removed through line 29 and recycled to the solvent feed line 25 for reuse in the process. The carbonate is removed from the still through line 30 and introduced into a single stage rectifier 31 where final purification is accomplished. The refined carbonate is removed from the rectifier 31 as product through line 32. The residue from the rectifier 31 is removed through line 33 and may be removed from the system through line 34. If the residue contains a substantial amount of carbonate, however, it may be recycled to the extractor column 24 through line 35.

Fig. 3 represents yet another embodiment of the invention. Crude carbonate in line 36, together with water, if needed, in line 37, is introduced into an extraction column 38. Through line 39, there is also introduced into the extraction column 38 a primary solvent, an aromatic hydrocarbon solvent. After extraction the water phase containing the impurities is removed from the system through line 40. The primary solvent-carbonate phase is led from the extraction column 38 through line 41 to a second extraction column 42. A secondary solvent, described below, is also led into the second extraction column 42 through line 43. After the second or back extraction refined carbonate is removed as product through line 44. The primary solvent-secondary solvent solution is led through line 45 into a continuous stripping still 46. In the still 46 the two solvents are separated. The primary solvent is led out through line 39 and back to the first extraction column 38 for reuse in the process. The secondary solvent is led out through line 43 and back to the second extraction column 42 for reuse in the process.

The process of the invention may be applied to a vast number of cyclic organic carbonates of the type represented by the general formulae:

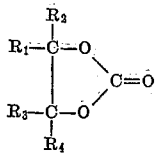

and

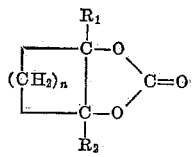

wherein $R_1$, $R_2$, $R_3$ and $R_4$ are hydrogen or alkyl or alkenyl groups and $n$ is a whole number and is usually three or four. The process of the invention is useful no matter how miscible or immiscible with water the particular carbonate treated may be. Thus ethylene carbonate, though totally miscible with water, may be readily refined by the process of the invention. The process is particularly useful for refining ethylene and propylene carbonate and these have been used for the examples, but the invention is not limited to these two.

Where the crude carbonate to be refined is a reaction product containing catalyst impurities, a neutralizing agent may be added to the water used in the process if desired, for the purpose of neutralizing these impurities to facilitate their removal.

The quantity of water used in the process will be from one-half percent to 95 percent by weight of the carbonate being refined. The exact proportion to be used will depend on the nature and proportion of the aromatic hydrocarbon solvent employed, the particular carbonate being refined and the number and efficiency of the extraction stages.

The aromatic hydrocarbon solvent used in the process must exhibit substantial, and preferably total, miscibility with or solubility in the carbonate being recovered. Suitable solvents include benzene, the alkyl homologs of benzene averaging less than three alkyl carbon atoms per benzene ring, naphthalene and those alkyl homologs of benzene boiling below 300° C. The solvent may of course comprise mixtures of aromatic compounds. A typical mixed solvent might include benzene, toluene, ethylbenzene, xylol, alpha- and beta- methylnaphthalenes and naphthalene. Some mixtures of aromatic hydrocarbons which are totally miscible with the carbonate may contain some hydrocarbons having a higher degree of alkylation than three carbon atoms. The ratio by volume of aromatic hydrocarbon solvent to carbonate being extracted will range from about 5 parts solvent and 95 parts carbonate to 95 parts solvent and 5 parts carbonate.

When back-extraction is employed to separate the carbonate from the aromatic hydrocarbon solvent, or primary solvent, a secondary solvent must be used. This secondary solvent must be a good solvent for the aromatic hydrocarbon solvent but immiscible with the carbonate; and have a boiling point substantially different from that of the aromatic hydrocarbon solvent. Non-aromatic hydrocarbons such as paraffins or naphthenes are preferred for this purpose. Mixtures of suitable solvents may also be used.

*Example I*

A crude reaction mixture of ethylene carbonate containing catalyst impurities was refined by the process of the invention using the procedure outlined in Figure 2 of the drawing. Per 100 parts by volume of total feed there was fed into a 12 stage 2 inch inside diameter York-Sheibel extractor 14.1 parts of crude ethylene carbonate, 1.2 parts of water and 84.7 parts of toluene, the toluene being used as the aromatic hydrocarbon solvent. Following the extraction, carried out at room temperature, approximately 25° C., and atmospheric pressure, the toluene-carbonate extract phase from the extractor was fed into a vacuum stripping still while the water phase was discarded. The vacuum stripping still was a packed column with a separating capacity of 15 to 20 theoretical plates and the vacuum stripping distillation was carried out at a pressure of approximately 50 mm. of mercury. Relatively pure ethylene carbonate was recovered from the still and was then rectified at a pressure of approximately 8 mm. of mercury to remove final traces of colored impurities.

No catalyst could be detected in the ethylene carbonate product after rectification and the product was water white with a melting point temperature of 35.6° C. as compared to 36.4° C. for absolutely pure ethylene carbonate.

Similar good results were obtained using benzene and benzene-toluene mixtures as the aromatic hydrocarbon solvent.

*Example II*

A crude reaction mixture of ethylene carbonate containing catalyst impurities was refined by the process of the invention using the procedure outlined in Figure 3 of the drawing. Two extraction columns of the type described in Example I were used. Per 100 parts by weight of total feed there was fed into the first column 14.0 parts of crude ethylene carbonate, 0.8 part of water and 85.2 parts of a mixture of aromatic hydrocarbons. The mixture of aromatic hydrocarbons used as the primary solvent was composed per 100 parts by volume of 5 parts benzene, 45 parts toluene, 15 parts ethylbenzene, 10 parts commercial grade xylol, 10 parts alpha-methylnaphthalene, 10 parts beta-methylnaphthalene and 5 parts of naphthalene.

Following the extraction, carried out at atmospheric pressure and room temperature, about 25° C., the water phase was discarded and the carbonate-primary solvent extract was fed into a second extraction column where the carbonate was separated from the primary solvent by back extracting the primary solvent at atmospheric pressure and room temperature, approximately 25° C., with a secondary solvent consisting of n-heptane. Two volumes of n-heptane were used per volume of primary solvent-carbonate extract. The raffinate from the second extraction column was then flash distilled at a reduced pressure and a temperature of about 110° C. to remove traces of the secondary solvent n-heptane. The refined ethylene carbonate product was water white and had a melting point temperature of 35.8° C. as compared to 36.4° C. for absolutely pure ethylene carbonate.

Example III

A solution consisting of water saturated with crude propylene carbonate was refined by the process of the invention. Per 100 parts by weight of total feed there was fed into a Podbielniak centrifugal extractor 7.7 parts of crude propylene carbonate, 30.9 parts of water and 61.4 parts of toluene, the toluene being used as the aromatic hydrocarbon solvent. Following the extraction, carried out at atmospheric pressure and at a temperature of 35° to 40° C., the toluene-carbonate extract phase was subjected to a single stage distillation which stripped off the toluene and rectified the carbonate remaining. The propylene carbonate thus obtained was then compared by infrared spectra with samples of known purity and found to have a purity of greater than 98 percent.

Example IV

A solution consisting of crude propylene carbonate saturated with water was refined by the process of the invention. Per 100 parts by weight of total feed there was fed into a Podbielniak centrifugal extractor 21.9 parts of crude propylene carbonate, 1.9 parts of water and 76.2 parts of toluene, the toluene being used as the aromatic hydrocarbon solvent. Following the extraction, carried out at atmospheric pressure and at a temperature of 35° to 40° C., the toluene-carbonate extract phase was subjected to a single stage distillation which stripped off the toluene and rectified the carbonate remaining. The propylene carbonate thus obtained was of very high purity, containing less than 0.05 percent of catalyst.

What we claim is:

1. A process for separating water from admixture with a cyclic organic carbonate having a formula selected from the group consisting of

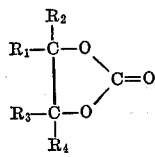

and

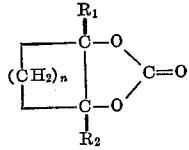

wherein $R_1$, $R_2$, $R_3$ and $R_4$ are each selected from the group consisting of hydrogen, lower alkyl groups and lower alkenyl groups and $n$ is a whole number not exceeding 4, which comprises adding to a water mixture of said carbonate a water-insoluble aromatic hydrocarbon primary solvent in which said carbonate is soluble, thereby forming a primary solvent-carbonate phase and a water phase immiscible with one another, separating from the mixture said primary solvent-carbonate phase, adding to said primary solvent-carbonate phase a non-aromatic hydrocarbon secondary solvent in which said primary solvent is miscible but in which said carbonate is immiscible, thereby forming a primary solvent-secondary solvent phase and a carbonate phase immiscible with one another, and separating and recovering said carbonate.

2. A process for removing water soluble impurities from a cyclic organic carbonate having a formula selected from the group consisting of

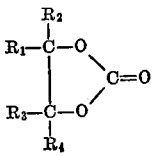

and

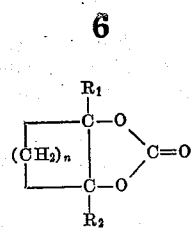

wherein $R_1$, $R_2$, $R_3$ and $R_4$ are each selected from the group consisting of hydrogen, lower alkyl groups and lower alkenyl groups and $n$ is a whole number not exceeding 4, which comprises adding to a water mixture of said carbonate a water-insoluble aromatic hydrocarbon primary solvent in which said carbonate is soluble, thereby forming a primary solvent-carbonate phase and a water-impurities phase immiscible with one another, separating from the mixture said primary solvent-carbonate phase, adding to said primary solvent-carbonate phase a non-aromatic hydrocarbon secondary solvent in which said primary solvent is miscible but in which said carbonate is immiscible, thereby forming a primary solvent-secondary solvent phase and a carbonate phase immiscible with one another, and separating and recovering said carbonate.

3. A process for removing water soluble impurities from a cyclic organic carbonate having a formula selected from the group consisting of

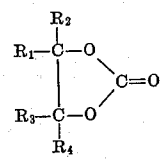

and

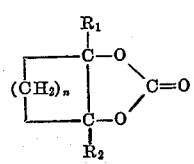

wherein $R_1$, $R_2$, $R_3$ and $R_4$ are each selected from the group consisting of hydrogen, lower alkyl groups and lower alkenyl groups and $n$ is a whole number not exceeding 4, which comprises simultaneously extracting said carbonate with water and with a water-insoluble aromatic hydrocarbon primary solvent in which said carbonate is soluble, thereby forming a primary solvent-carbonate extract phase and a water-impurities raffinate phase immiscible with one another, adding to said primary solvent-carbonate phase a non-aromatic hydrocarbon secondary solvent in which said primary solvent is miscible but in which said carbonate is immiscible, thereby forming a primary solvent-secondary solvent phase and a carbonate phase immiscible with one another, and separating and recovering said carbonate.

4. A process for removing water soluble impurities from a cyclic organic carbonate having a formula selected from the group consisting of

[formula]

and

[formula]

wherein $R_1$, $R_2$, $R_3$ and $R_4$ are each selected from the group consisting of hydrogen, lower alkyl groups and lower alkenyl groups and $n$ is a whole number not exceeding 4, which comprises mixing said carbonate with a water-insoluble aromatic hydrocarbon primary solvent in which said carbonate is soluble, thereby forming a primary solvent-carbonate phase, extracting said primary solvent-carbonate phase with water and thereby removing said impurities in a water impurities phase, adding to said primary solvent-carbonate phase a non-aromatic hydrocarbon secondary solvent in which said primary solvent is miscible but in which said carbonate is immiscible, thereby forming a primary solvent-secondary solvent phase and a carbonate phase immiscible with one another, and separating and recovering said carbonate.

5. A process for separating water from admixture with ethylene carbonate which comprises adding to a water-ethylene carbonate mixture a water-insoluble aromatic hydrocarbon primary solvent in which said ethylene carbonate is soluble, thereby forming a primary solvent-ethylene carbonate phase and a water phase immiscible with one another, separating from the mixture said primary solvent-ethylene carbonate phase, adding to said primary solvent-ethylene carbonate phase a non-aromatic hydrocarbon secondary solvent in which said primary solvent is miscible but in which said ethylene carbonate is immiscible, thereby forming a primary solvent-secondary solvent phase and an ethylene carbonate phase immiscible with one another, separating and recovering said ethylene carbonate.

6. A process for separating water from admixture with propylene carbonate which comprises adding to a water-propylene carbonate mixture a water-insoluble aromatic hydrocarbon primary solvent in which said propylene carbonate is soluble, thereby forming a primary solvent-propylene carbonate phase and a water phase immiscible with one another, separating from the mixture said primary solvent-propylene carbonate phase, adding to said primary solvent propylene carbonate phase a non-aromatic hydrocarbon secondary solvent in which said primary solvent is miscible but in which said propylene carbonate is immiscible, thereby forming a primary solvent-secondary solvent phase and a propylene carbonate phase immiscible with one another, separating and recovering said propylene carbonate.

7. A process for refining crude ethylene carbonate containing water soluble impurities which comprises adding to a water-ethylene carbonate mixture a water-insoluble aromatic hydrocarbon primary solvent in which said ethylene carbonate is soluble, thereby forming a primary solvent-ethylene carbonate phase and a water-impurities phase immiscible with one another, separating from the mixture said primary solvent-ethylene carbonate phase, adding to said primary solvent-ethylene carbonate phase a non-aromatic hydrocarbon secondary solvent in which said primary solvent is miscible but in which said ethylene carbonate is immiscible, thereby forming a primary solvent-secondary solvent phase and an ethylene carbonate phase immiscible with one another, separating and recovering said ethylene carbonate.

8. A process for refining crude propylene carbonate containing water soluble impurities which comprises adding to a water-propylene carbonate mixture a water-insoluble aromatic hydrocarbon primary solvent in which said propylene carbonate is soluble, thereby forming a primary solvent-propylene carbonate phase and a water-impurities phase immiscible with one another, separating from the mixture said primary solvent-propylene carbonate phase, adding to said primary solvent-propylene carbonate phase a non-aromatic hydrocarbon secondary solvent in which said primary solvent is miscible but in which said propylene carbonate is immiscible, thereby forming a primary solvent-secondary solvent phase and a propylene carbonate phase immiscible with one another, separating and recovering said propylene carbonate.

References Cited in the file of this patent

UNITED STATES PATENTS

| | | |
|---|---|---|
| 1,995,291 | Carothers | Mar. 26, 1935 |
| 2,210,817 | Peterson | Aug. 6, 1940 |
| 2,688,645 | Badertscher et al. | Sept. 7, 1954 |

OTHER REFERENCES

Morton: Laboratory Technique in Organic Chemistry, McGraw-Hill, New York, N.Y., 1938, pp. 195–208.